United States Patent [19]

Udagawa

[11] Patent Number: 5,563,862
[45] Date of Patent: Oct. 8, 1996

[54] WRITE ONCE OPTICAL DISC RECORDING APPARATUS WITH REDUCED DATA ERROR RATE BECAUSE THE VALUE OF ASYMMETRY IS EQUALIZED AS ADDITIONAL DATA IS RECORDED THEREON

[75] Inventor: Osamu Udagawa, Kanagawa, Japan

[73] Assignee: Sony Corporation, Tokyo, Japan

[21] Appl. No.: 452,151

[22] Filed: May 26, 1995

[30] Foreign Application Priority Data

May 31, 1994 [JP] Japan .................. 6-119416

[51] Int. Cl.⁶ ........................................ G11B 7/00
[52] U.S. Cl. ............................... 369/54; 369/58
[58] Field of Search ................... 369/54, 116, 58, 369/59

[56] References Cited

U.S. PATENT DOCUMENTS

| | | | |
|---|---|---|---|
| 5,175,719 | 12/1992 | Iimura | 369/58 |
| 5,202,877 | 4/1993 | Yanagida | 369/54 |
| 5,295,124 | 3/1994 | Shirako | 369/32 |
| 5,353,270 | 10/1994 | Iimura | 369/54 |
| 5,406,533 | 4/1995 | Maeda | 369/54 |
| 5,434,837 | 7/1995 | Haneda et al. | 369/54 |
| 5,450,383 | 9/1995 | Call et al. | 369/54 |
| 5,453,964 | 9/1995 | Shimizume | 369/48 |
| 5,469,415 | 11/1995 | Fujita et al. | 369/54 |
| 5,490,127 | 2/1996 | Ohta et al. | 369/116 |
| 5,493,549 | 2/1996 | Miyazawa | 369/116 |
| 5,526,331 | 6/1996 | Park et al. | 369/54 |

*Primary Examiner*—Aristotelis Psitos
*Assistant Examiner*—Duncan Wilkinson
*Attorney, Agent, or Firm*—Limbach & Limbach L.L.P.

[57] ABSTRACT

An apparatus for recording data signals onto an optical recording medium is disclosed. The apparatus includes a unit for radiating a laser beam onto the optical recording medium, a photo-electric converting unit for converting the laser beam reflected from the optical recording medium into an electrical signal, a first detection unit for detecting whether or not the data signals are recorded on the optical recording medium, a second detection unit for detecting a value of asymmetry based upon an output of the photo-electric converting unit, and a control unit for detecting, prior to recording of the data signals on the optical recording medium, whether or not the data signals are recorded in a region proximate to a region of the optical recording medium in which the data signals are to be recorded. The control unit sets a value of asymmetry detected by the second detection unit based on the data signal reproduced from the proximate region as being a target value of asymmetry when the data signals are recorded in the proximate region. The control unit also sets a predetermined value of asymmetry as the target value of asymmetry when data signals are not recorded in the proximate region.

8 Claims, 9 Drawing Sheets

S1

P

TOP
SL
RF
BTM
0V LEVEL

D1

PRIOR ART

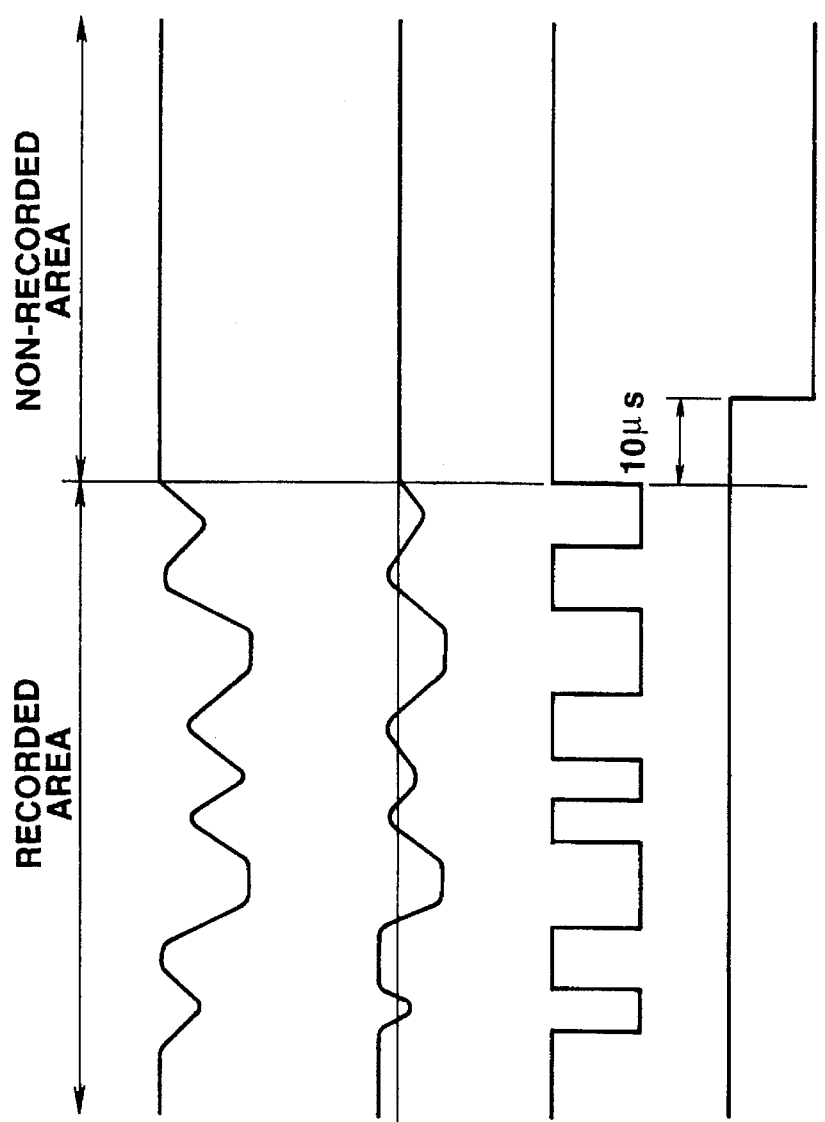

WRITE ONCE OPTICAL DISC RECORDING APPARATUS WITH REDUCED DATA ERROR RATE BECAUSE THE VALUE OF ASYMMETRY IS EQUALIZED AS ADDITIONAL DATA IS RECORDED THEREON

BACKGROUND OF THE INVENTION

This invention relates to an optical disc recording device for radiating a laser beam on an optical disc for recording data thereon.

There has so far been known an optical disc device in which a laser light beam is radiated on a disc-shaped recording medium for sequentially forming pits for recording the information thereon. Such optical disc device may be exemplified by a CD-recordable (CD-R) drive device pursuant to the standard for the so-called compact disc.

The optical disc employed in this CD-R drive device is a so-called write-once type optical disc in which a strong laser beam is radiated on recording layer portions between pre-grooves on the optical disc, which are pre-formed guide grooves, for modifying the optical properties of the recording layer in order to permit the information to be recorded only once and for all on the disc.

Specifically, with the CD-R device, recording data is modulated with eight-to-fourteen modulation (EFM) for generating a modulated signal S1 in which the probability of occurrence of logical "1" and that of occurrence of logical "0" will be equal to each other, as shown in FIG. 1A. A laser beam is radiated from a laser diode based on the modulated signal S1 as reference. The laser beam is intermittently radiated on the optical disc in association with the logical level of the modulated signal S1. This generates regions of low reflectance, that is pits, in the recording layer portions between the pre-grooves. The laser diode is driven at this time at a high output.

The modulated signal S1 is generated so that a high level and a low level will continue within a time interval range of 3T to 11T, T being a reference period. This sequentially produces pits P for effecting data recording. The high reflectance regions in which the pits have not been formed are termed lands.

During data reproduction, the laser diode is driven at a low output for radiating a output laser beam on the optical disc. The laser light reflected from the optical disc irradiated with the laser light beam is received by a photodetector. The playback signal having its signal level changed responsive to the volume of the reflected light as shown in FIG. 1C, that is the RF signal, is produced. The signal level of the RF signal is detected with a slice level SL as a reference for detecting playback data shown in FIG. 1D.

Since the recording signal S1 is generated by EFM so that the probability of occurrence of logical "0" and that of logical "1" will be equal to each other, the slice level SL is selected so that the probability of occurrence of logical "0" and that of logical "1" will also be equal to each other with the playback data D1. This diminishes the bit error rate.

On the other hand, during data recording, the pit size is changed responsive to changes in the ambient temperature or in the laser wavelength, even although the laser diode is driven at a constant power for radiating the laser beam. For this reason, the laser diode driving power is sequentially switched in recording test data in a trial test region on the optical disc. The test data so recorded is reproduced for detecting an asymmetry value Asy for each step of the driving power. The asymmetry values can be detected easily using an asymmetry detection circuit. Of the detected asymmetry values Asy, that asymmetry value Asy closest to a pre-set asymmetry value Asy is selected. The driving power when the selected asymmetry value Asy is obtained is set as an optimum value of the driving power of the laser diode.

The asymmetry value is the time average ratio between pits and lands. Specifically, with respect to the reproduced RF signal from the optical disc, having a waveform shown in FIG. 2, the asymmetry value is represented based upon the relation between the slice level SL for the playback data D1 shown in FIG. 1D which will give an equal probability of occurrence of the logical "0" to that of the occurrence of the logical "1" on one hand and the peak and bottom levels of the playback signal on the other hand. That is, the asymmetry value is given, using a peak level $X_1$ and a bottom level $X_4$ for the pulse width lit and a peak level $X_2$ and a bottom level $X_3$ for the pulse width 3T, by the following equation (1):

$$Asy = \frac{\frac{X_2 + X_3}{2} - \frac{X_1 + X_4}{2}}{X_1 - X_4} \quad (1)$$

With the above-described CD-R drive device, such asymmetry value of the recording signal recorded on the optical disc is selected which will give a minimum data error rate when decoding RF signals produced on reading out the recorded signal, such as by conversion into bi-level data. The asymmetry value which will give the minimum data error rate is governed by characteristics of the optical system of the CD-R drive device, laser light emitting time or optical disc characteristics. Thus the target asymmetry value differs with the machine versions or the manufacturers of the CD-R drive device.

For example, there may be an occasion wherein the target asymmetry value of a CD-R drive device manufactured by a company A is 0%, that of a CD-R device manufactured by another company B is −5%. If, in such case, data recording is made by the CD-R device manufactured by the company A up to a mid portion of an optical disc, and subsequent data recording is made by the CD-R drive device manufactured by the company B by way of supplementary data recording, the asymmetry value of the RF signal varies abruptly by 5% before and after the start of the supplementary data recording.

Although the slice level for converting the RF signal into a corresponding hi-level signal with the CD drive device or the CD-R drive device is configured for being changed during reproduction depending upon the asymmetry value of the RF signal, such change in the asymmetry value can be followed only within a range of tens of kilohertz.

Thus, when reading out data from an optical disc, on which supplementary data recording has been made on the CD drive device or the CD-R drive device in such as manner that the asymmetry value is changed abruptly ahead and at back of the start of the supplementary recording, the slice level cannot follow changes in the asymmetry value before and at back of the start of the supplementary data recording, thus frequently producing errors when converting the RF signal into a corresponding hi-level signal.

OBJECT AND SUMMARY OF THE INVENTION

In view of the above-depicted state of the art, it is an object of the present invention to provide an optical disc recording apparatus capable of effecting supplementary data recording without the asymmetry value being abruptly changed before and at back of start of the supplementary data recording.

According to the present invention, there is provided an apparatus for recording data signals onto an optical recording medium including means for radiating a laser beam onto the optical recording medium, photo-electric converting means for converting the laser beam reflected from the optical recording medium into an electrical signal, first detection means for detecting whether or not the data signals are recorded on the optical recording medium, second detection means for detecting a value of asymmetry based upon an output of the photo-electric converting means, and control means for detecting, prior to recording of the data signals on the optical recording medium, whether or not the data signals are recorded in a region proximate to a region of the optical recording medium in which the data signals are to be recorded. The control means sets a value of asymmetry detected by the second detection means based on the data signal reproduced from the proximate region as being a target value of asymmetry when the data signals are recorded in said proximate region. The control means also sets a predetermined value of asymmetry as the target value of asymmetry when data signals are not recorded in the proximate region.

It is possible with the optical disc recording apparatus of the present invention to reduce the data error rate because the value of asymmetry may be detected from data previously recorded on the optical disc when additionally recording data thereon and the value of asymmetry of the additionally recorded data may be equated to the value of asymmetry of previously recorded data.

BRIEF DESCRIPTION OF THE DRAWINGS

FIGS. 6A to 6D are timing charts for illustrating the operation of the RF detection circuit shown in FIG. 5.

DETAILED DESCRIPTION OF THE PREFERRED EMBODIMENT

Figure 1A:
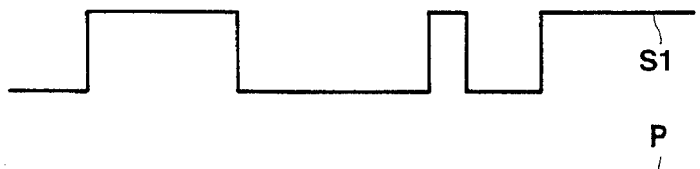
FIGS. 1A to 1D are waveform diagrams showing the signal waveform during data recording and reproduction in the conventional practice.
Figure 1B:
Figure 1C:
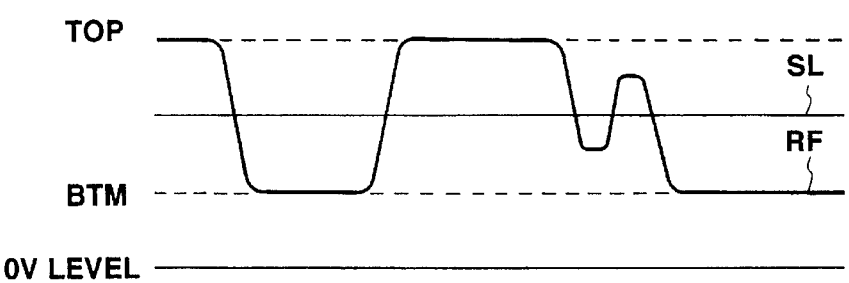
Figure 1D:
Figure 2:
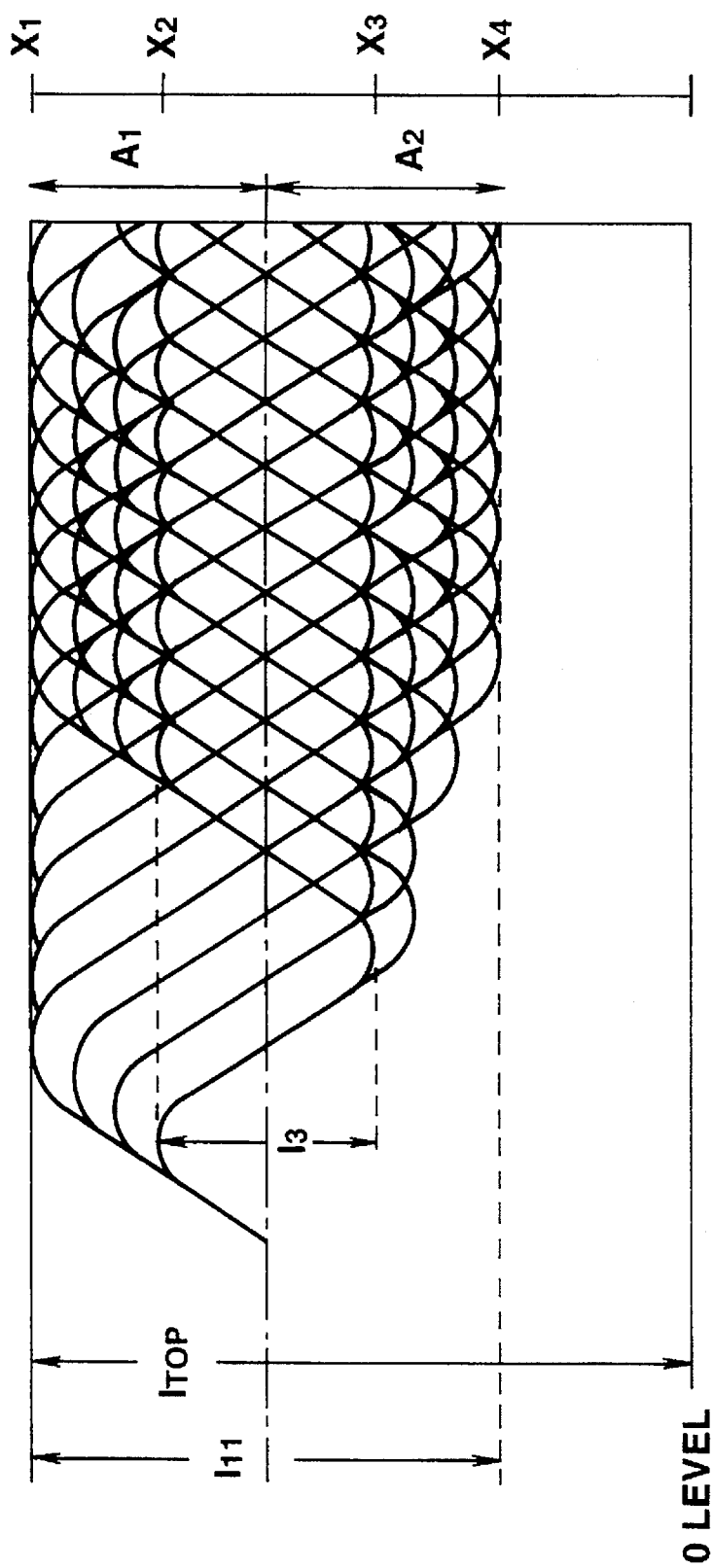
FIG. 2 is a graph for illustrating RF signal asymmetry in the conventional practice.
Figure 3:
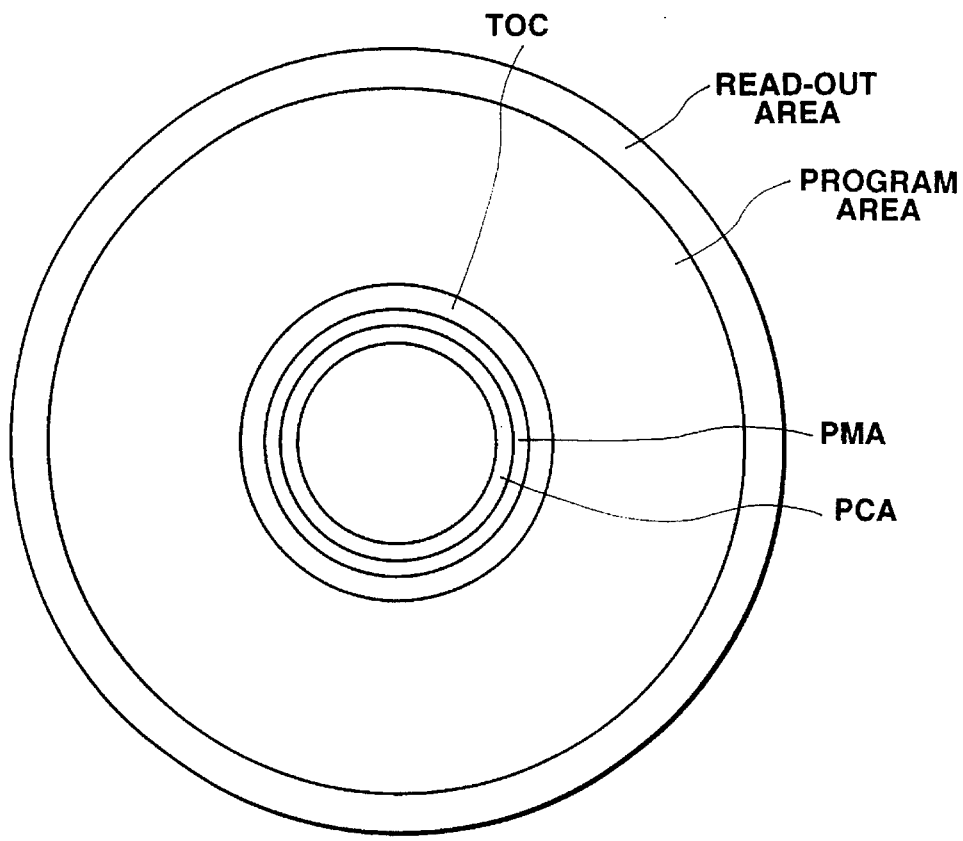
FIG. 3 is a schematic view showing a recording format for an optical disc according to the present invention.

By first referring to FIG. 3, the recording format of an optical disc 7 according to the present invention is explained in detail.

As shown in FIG. 3, the optical disc 7 has a program area on the inner peripheral side and the outer peripheral side of which a lead-in area inclusive of a table-of-contents (TOC) area and a lead-out area are provided, respectively. On the further inner peripheral side of the lead-in area are provided a program memory area PMA for recording the recording state of the program area and a power control area PCA as a trial-write area for writing data for adjusting the laser driving power.

Figure 4:
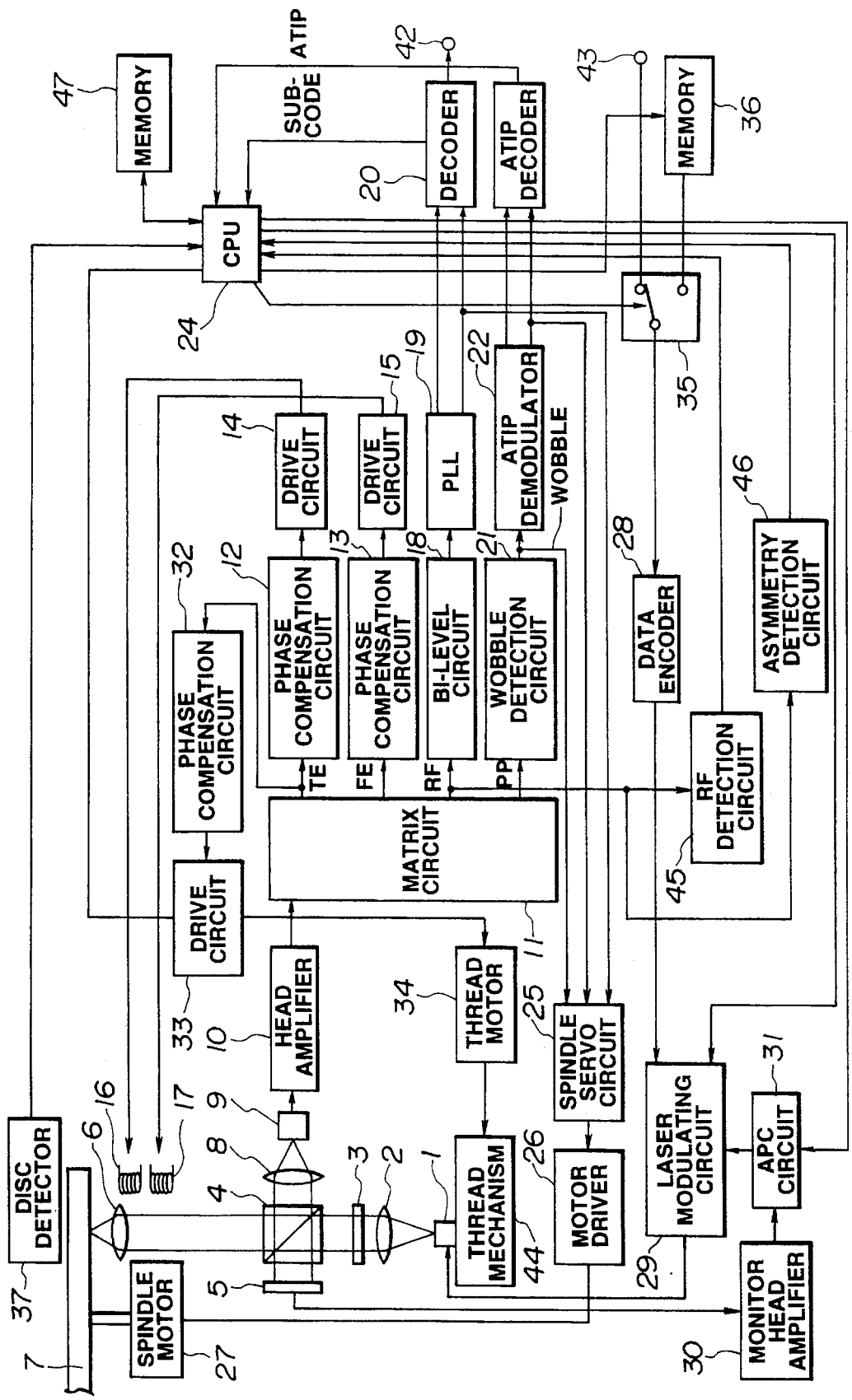
FIG. 4 is a block diagram of an optical disc device according to the present invention.

The optical disc device according to the present invention is now explained briefly by referring to the block diagram of FIG. 4.

In this figure, a laser beam radiated by a laser diode 1 is collimated by a collimation lens 2 and thence conducted via a grating 3 and a beam splitter 4 to an objective lens 8 whereby it is converged on an optical disc 7.

On the other hand, part of the light beam incident on the beam splitter 4 is thereby split so as to be incident on a laser monitor 5. The light beam incident on the laser monitor 5 is photo-electrically converted to produce a current value proportionate to the light volume. The current value is supplied to a monitor head amplifier 30 where it is converted into a voltage value which is then supplied to an automatic power control (APC) circuit 31. The APC circuit employs the signal from the monitor head amplifier 30 in order to effect control so that the laser light output volume from the laser diode 1 will be constant irrespective of extraneous factors, such as temperature. A control signal from the APC circuit 31 is fed to a laser modulation circuit 29. The laser modulation circuit 29 drives the laser diode 1 with a laser driving power based upon the control signal from the APC circuit 31.

The laser beam radiated on and reflected back from the optical disc 7 is incident via the objective lens 6 on the beam splitter 4. The beam splitter 4 guides the reflected laser beam to a multiple lens 8. The multiple lens is made up of a cylindrical lens, a converging lens etc. and converges the reflected light incident thereon on a photodetector 9.

An output of the photodetector 9 is converted by a head amplifier 10 into a corresponding voltage value which is outputted to a matrix circuit 11. The matrix circuit adds and subtracts the outputs of the head amplifier 10 for generating a tracking error signal, a focusing error signal and a push-pull signal PP in a known manner.

The tracking error signal TE and the focusing error signal FE are supplied to phase compensation circuits 12 and 13, respectively. The phase-adjusted tracking error signal TE from the phase compensation circuit 12 is supplied to a driving circuit 14. The driving circuit 14 actuates a tracking actuator 16 based upon the tracking error signal from the phase compensation circuit 12. This tracking-controls the objective lens 6 with respect to the optical disc 7. The driving circuit 15 actuates a focusing actuator 17 with the aid of the TE signal from the phase compensation circuit 13. This focusing-controls the objective lens 6 with respect to the optical disc 7.

On the other hand, low-frequency components of the tracking error signal TE are fed to a thread phase compensation circuit 32 for phase compensation. The phase-compensated signal from the thread phase compensation circuit 32 is fed to a driving circuit 33. The driving circuit 33 drives a thread motor 34 with the aid of a signal from the thread phase compensation circuit 32 for causing controlled movement of a thread mechanism 44.

The output push-pull signal PP from the matrix circuit 11 is outputted to a wobble detection circuit 21. The wobble detection circuit detects a wobble signal pre-formed along a track on the optical disc 7 and outputs the detected wobble signal to an absolute-time-in-pregroove (ATIP) demodulator 22. The ATIP demodulator 22 detects the ATIP and the ATIP read-out clock signal from the detected wobble signal. The detected ATIP and the ATIP read-out clock signals are fed to an ATIP decoder 23. The ATIP decoder reproduces the address information with the aid of the ATIP and the ATIP read-out clock signals. The address information is fed to a CPU 24.

The wobble signal detected by the wobble detection circuit 21 and the ATIP read-out clock signal detected by the ATIP demodulator 22 are also outputted to a spindle servo circuit 25. The spindle servo circuit drives a spindle motor 27 via a motor driver 26 with the aid of the wobble signal and the ATIP read-out clock signals. At this time, the spindle servo circuit 25 effectuates control so that the wobble signal detected by the wobble detection circuit 21 will be at a constant frequency of 22.05 kHz or so that the ATIP read-out clock signals outputted by the ATIP demodulator 22 will be at a constant frequency of 6.35 kHz.

The output RF signals from the matrix circuit 11 are fed to a bi-level circuit 18 where it is converted into a corresponding bi-level signal which is fed to a PLL circuit 19. The PLL circuit 19 generates clock signals from the bi-level signal. The resulting clock signals are fed along with the bi-level signal to a decoder circuit 20. The decoder circuit 20 decodes the bi-level signal based upon the clock signals. This reproduces the data signals and the subcode. The reproduced data signals are outputted at an output terminal 42, while the subcode is routed to the CPU 24.

The clock signals generated by the PLL circuit 19 are entered to the spindle servo circuit 25 for comparison with reference clock signals. The comparison output is fed as a rotation error signal to a motor driver 26. The motor driver 26 controls the driving of a spindle motor 27 based upon the rotation error signal.

The above-described operation is carried out both during data reproduction from the optical disc 7 and during data recording on the optical disc 7.

Before explaining the operation during the recording mode, an RF detection circuit 45 employed for the recording mode is explained.

Figure 5:
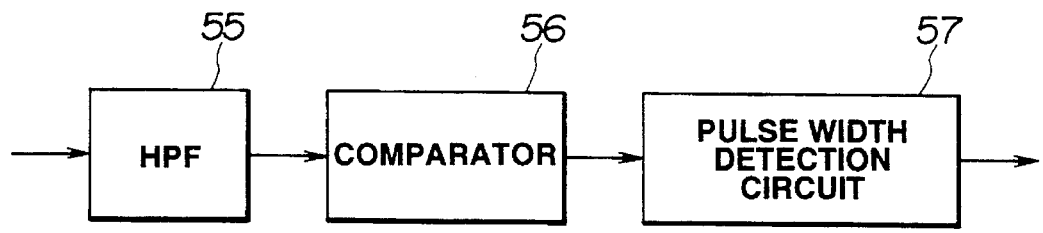
FIG. 5 is a block diagram showing an example of an RF detection circuit according to the present invention.

During the data recording mode for the optical disc 7, the RF detection circuit 45 detects, based upon the RF signal, whether or not data has been recorded on the optical disc 7. The resulting detection signal is routed to the CPU Examples of known RF detection circuits 45 are shown in U.S. Pat. No. 5,175,719. FIG. 5 shows another example of the RF detection circuit 45.

FIG. 6A shows the RF signal entered to the RF detection circuit 45. FIG. 6A shows that, while the RF signal reproduced from a region having data recorded therein is changed in signal level, the RF signal reproduced from the non-recorded region is substantially constant in signal level. The RF signal is passed through a high-pass filter (HPF) 55 where a signal having a signal level centered about the zero level is produced, as shown in FIG. 6B.

An output signal of the HPF 55 is entered to a comparator 56 where it is sliced at a pre-set slicing level. This gives an output signal which becomes '0' and "1" depending upon the pulse width of a period of 3T or 11T in the recorded region and which has a pulse width longer than 11T and perpetually becomes "1" in the non-recorded region, as shown in FIG. 6C. This output signal is entered to a pulse width detection circuit This pulse width detection circuit 57 outputs a detection signal which becomes "1" when the pulse width of the bi-level signal is shorter than 11T thus indicating the signal to be a playback signal from the recorded region and which becomes "0" when the pulse width of the bi-level signal is longer than 11T thus indicating the signal to be a playback signal from the non-recorded region. The detection signal is shown in FIG. 6D.

Figure 7:
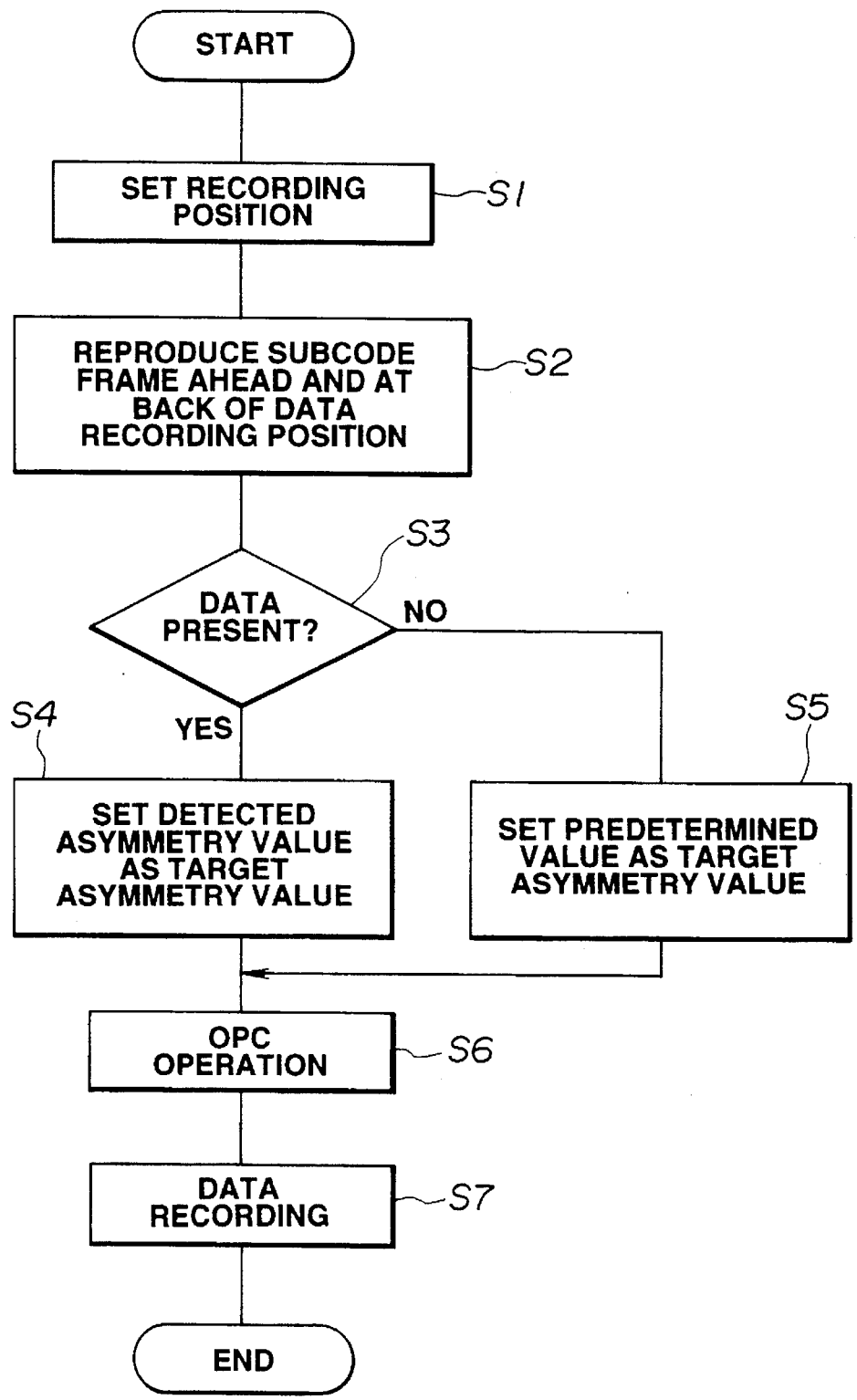
FIG. 7 is a flow chart for illustrating a typical operation of an optical disc device according to the present invention.

The data recording operational sequence, which is carried out under control by the CPU 24, is shown in the flow chart of FIG. 7.

At step S1, the data recording positions on the optical disc 7, that is the recording start position and the recording end position, are set under a command from a host computer, not shown, or a command from an input unit connected to an optical disc device. It is noted that continuous data recording and reproduction on and from the optical disc 7 is carried out from the inner periphery towards the outer periphery of the disc.

At the next step S2, the optical pickup is moved by track jump to the leading end of a region of a pre-set data volume just ahead of the data recording position. The size of the region is set so as to be sufficient to detect the value of asymmetry. The region is preferably of a necessary minimum value since an excessive size of the region leads to prolonged detection time in detecting the value of asymmetry. The region is selected herein to be equal to one sub-frame code data.

The CPU 24 transmits a control signal to the driving circuit 33 to control the thread motor 34 for driving the thread mechanism 44 for moving the optical pickup made up e.g. of the laser diode 1 along the radius of the optical disc 7. This shifts the optical pickup to a sub-code frame directly before the recording start position on the optical disc 7. The CPU 24 further drives the APC circuit 31 for driving the laser diode 1 with a reproducing laser driving power for reproducing the data of the sub-code frame directly before the recording start position by the optical pickup. The RF signal obtained via the light-receiving element 9 of the optical pickup, head amplifier 10 and the matrix circuit 11 is routed to the RF detection circuit 45. The RF detection circuit 45 detects whether or not data has been recorded in the subcode frame directly before the recording start position.

The detection signal of the RF detection circuit 45 is routed to the CPU 24 where it is judged at step S3 whether or not data has been recorded in the subcode frame directly ahead of the recording start position.

The CPU 24 then causes the region of at least one subcode frame directly at back of the recording end position to be reproduced. It is now judged, by a method similar to that described above, whether or not data has been recorded in the subcode frame directly at back of the recording end position.

If data has been recorded in the subcode frame directly ahead of the recording start position or in the subcode frame directly at back of the recording end position, the CPU 24 transfers to step S4.

An asymmetry detection circuit 46 detects the value of asymmetry from the RF signal reproduced at step S2 and outputs the detected value to the CPU 24.

At step S4, the CPU 24 sets the value of asymmetry, as detected by the asymmetry detection circuit 46, as being a target value of asymmetry, and causes the target value of asymmetry to be stored in a memory 47.

If it is found at step S3 that no data is recorded in the subcode frame directly before the recording start position or in the subcode frame directly after the recording end position, the CPU transfers to step S5 where a standard value of asymmetry pre-stored in the memory 47 is set as being a target value of asymmetry which is then stored in the memory 47.

The CPU then transfers to step S6 to perform an OPC operation, that is calibration of the laser driving power. The CPU then controls the driving circuit 33 for shifting the optical pickup device, made up e.g. of the laser diode 1, to the PCA of the optical disc 7. The test data, read out from the memory 36 with the progressively changed laser driving power is then recorded on the PCA. The values of asymmetry are detected from the RF signals obtained on reproducing the test data recorded with the varying laser driving power. From these values of asymmetry, that value of asymmetry is selected which is closest to the target value of asymmetry as set at step S4 or S5.

At step S7, the APC circuit 31 is controlled so that the laser driving power will be equal to the laser driving power used when recording the test data from which the value of asymmetry selected at step S6 is derived. Data recording is then performed as from the recording start position.

Figure 8:
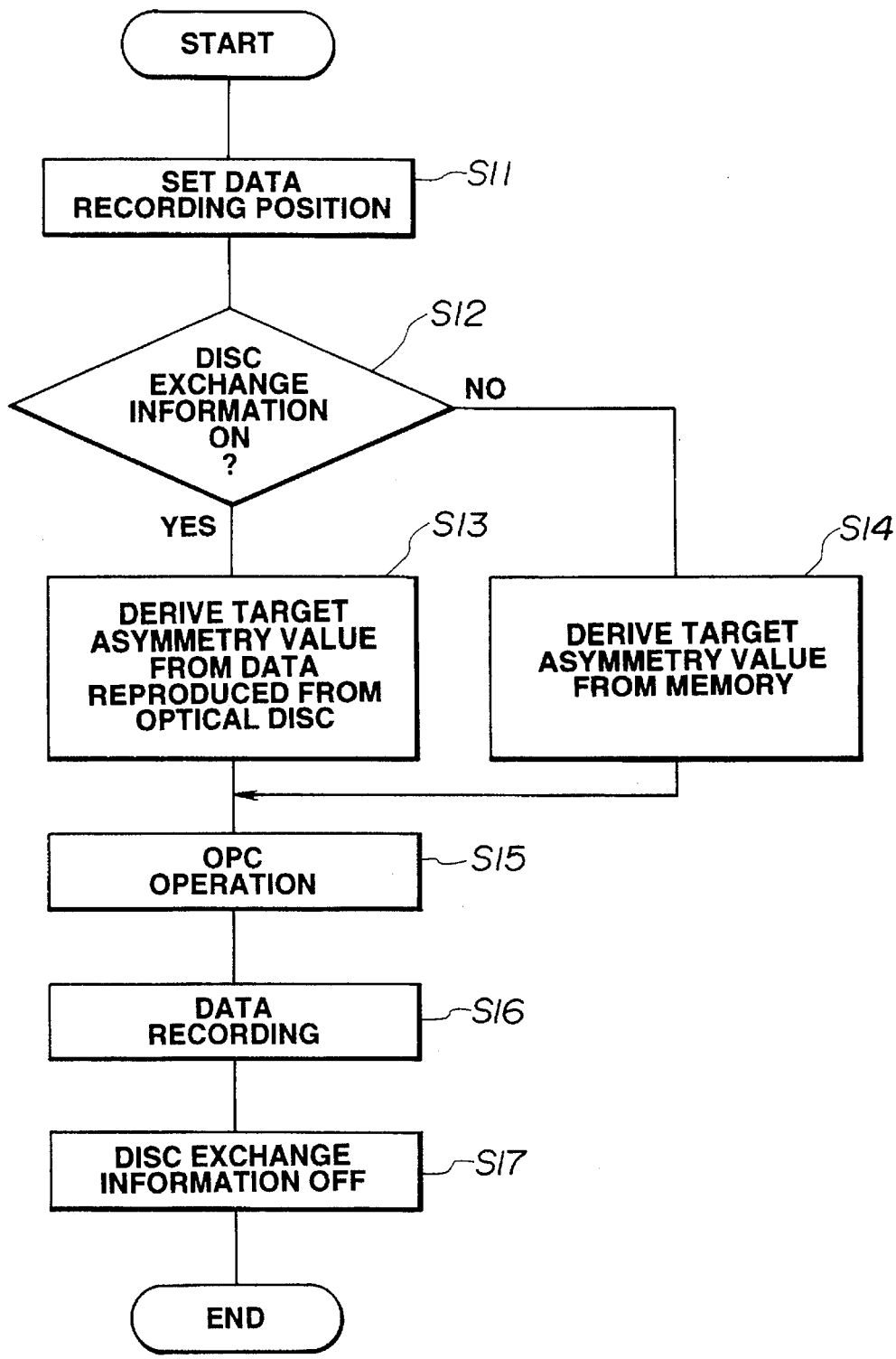
FIG. 8 is a flow chart for illustrating another typical operation of the optical disc device according to the present invention.

Referring to the flow chart of FIG. 8, a modified embodiment of the present invention is now explained. At step S11, the recording position is set. The operation at step S11 corresponds to that at step S1 in the flow chart shown in FIG. 7. At step S12, it is judged whether or not the disc exchange information is ON. Such judgement as to whether or not the optical disc 7 has been exchanged is given based upon the results of detection from the disc detection unit 34. The disc detection unit 34 may be a photocoupler or the like. The disc exchange information is OFF and ON until the optical disc 7 is exchanged and when the disc 7 has been exchanged, respectively. If the disc exchange information is ON, no setting of the target value of asymmetry has been effectuated since the optical disc 7 is loaded on the optical disc device. In such case, the CPU transfers to step S13 for detecting the target value of asymmetry. The target value of asymmetry is stored in the memory 47. The operation at step S13 corresponds to that since step S2 until step S5 in the flow chart of FIG.7. If the disc exchange information at step S12 is OFF, the CPU transfers to step S14 for setting the target value of asymmetry stored in the memory 47. At the next step S15, the operation of calibrating the laser driving power is carried out as at step S6 of the flow chart shown in FIG. 7. At the next step S16, the APC circuit 31 is controlled so that the laser driving power will be equal to that used when recording the test data from which the value of asymmetry closest to the target value of asymmetry is derived. Data recording is then performed as from the recording start position.

Figure 9A:
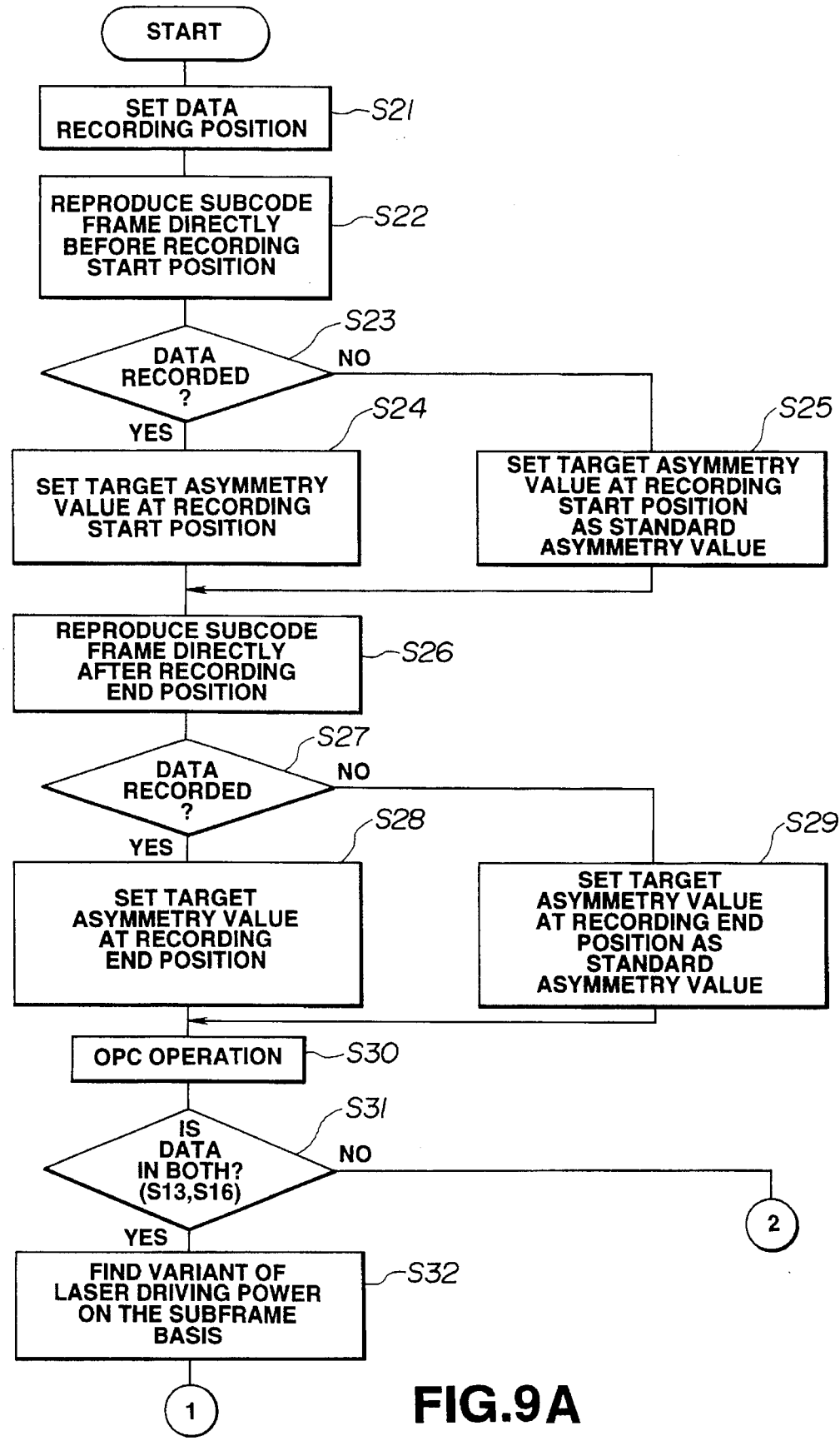
FIGS. 9A to 9C are flow charts for illustrating still another typical operation of the optical disc device according to the present invention.
Figure 9B:
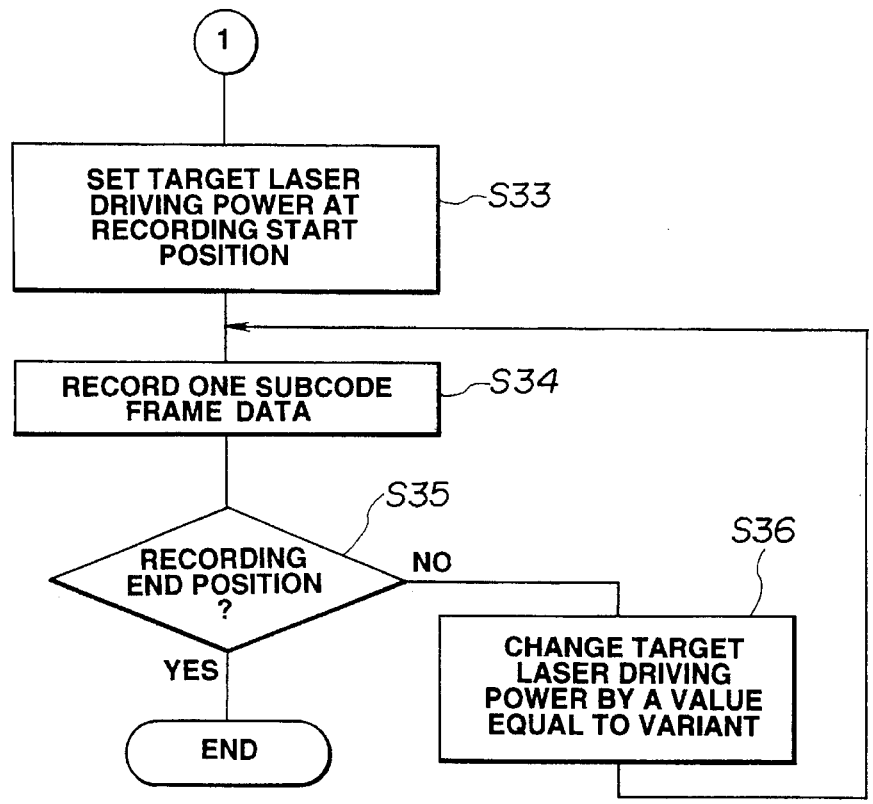
Figure 9C:
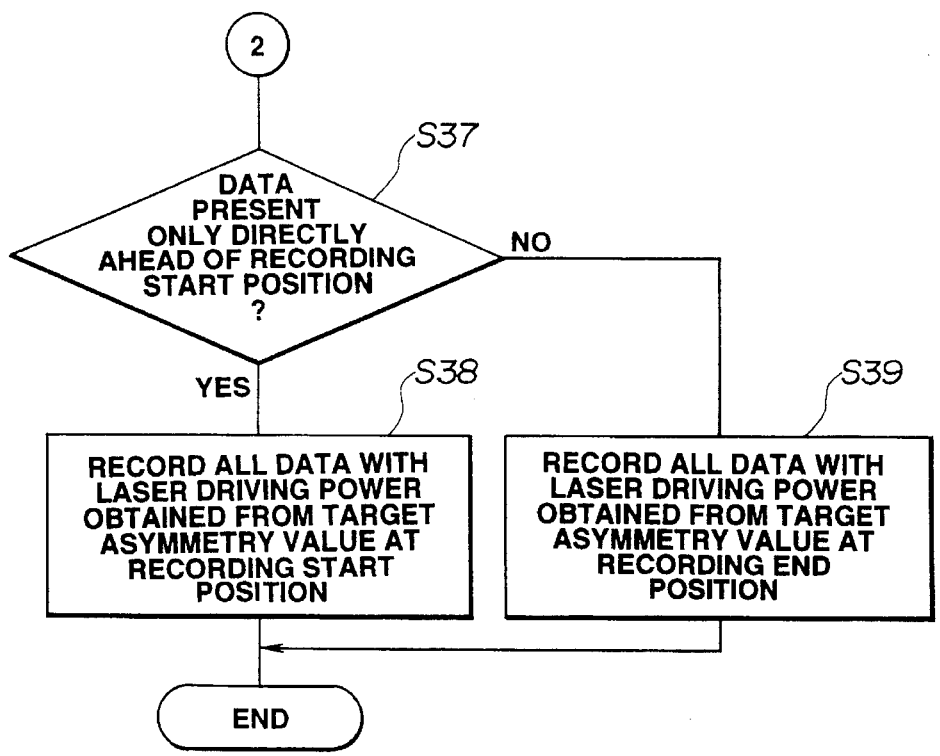

Referring to the flow chart shown in FIGS. 9A to 9C, a further modified embodiment of the present invention is explained. In the present modification, data is recorded in both the subcode frame directly before the data recording position and the subcode frame directly after the data recording position. A pre-set amount of data is recorded at the laser driving power as set based upon the value of asymmetry detected from the subcode frame ahead of the recording start position. Data recording in the same pre-set amount is then carried out a plural number of times as the laser driving power is sequentially changed a pre-set value each time for approaching the laser driving power as set based upon the value of asymmetry detected from the sub-code frame directly at back of the recording end position.

At step S21, a data recording position is set. At the next step S22, the subcode frame directly ahead of the recording start position is reproduced. At step S23, it is detected whether or not data has been recorded in the subcode frame directly before the recording start position. This detection is performed based upon an output of the RF detection circuit 45. If the data is found to be recorded, the CPU transfers to step S24 where the value of asymmetry at the recording start position is detected based upon data reproduced from the subcode frame directly ahead of the recording start position and the detected value of asymmetry is stored in the memory 47 as being the target value of asymmetry. If no data is found to be recorded at step S23, the standard value of asymmetry is set as the target value of asymmetry at the recording start position. That is, the standard value of asymmetry is stored as being the set or target value of asymmetry in the memory 47. At the next step S26, the subcode frame directly at back of the recording end position is reproduced. At the next step S27, it is detected whether or not data is recorded in the subcode frame directly at back of the recording end position. If the data is found to be recorded, the CPU proceeds to step S28 where the value of asymmetry at the recording end position is detected based upon data reproduced from the subcode frame directly at back of the recording end position and the detected value of asymmetry is stored in the memory 47 as being the set or target value of asymmetry. If data is found to be not recorded at step S27, the standard value of asymmetry is set as being the target value of asymmetry at the recording end position. At the next step S30, the OPC (optimum power control) operation, that is the operation of calibrating the laser driving power, is carried out. The OPC operation is carried out only for the subcode frame directly ahead of the recording start position or the subcode frame or the subcode frame directly at back of the recording end position in which data has been found to be recorded.

The OPC operation, that is the operation of finding an optimum value of the laser driving power during recording of the laser diode 1, is now explained in detail.

The optimum value of the laser driving power is the value of the laser driving power for the laser diode 1 which is used when recording the RF signal having the value of asymmetry which will give the minimum data error rate on reproduction. During the OPC operation, the spindle motor 27 and the thread mechanism 44 are controlled for shifting the optical pickup to the PCA of the optical disc 7. A switch 35 is then changed over so as to be connected to the memory 36 so that test data for detecting the value of asymmetry stored in the memory 36 is read out and routed via a data encoder 28 to a laser modulating circuit 29. The APC circuit 31 is then controlled for driving the laser diode 1 at plural values of the laser driving power. This causes the test data to be recorded in the PCA of the optical disc 7 with plural different values of the laser driving power. The recorded test data is reproduced for detecting the values of asymmetry for the respective values of the laser driving power by the asymmetry detecting circuit 46. The CPU 24 detects the value of asymmetry among the values of asymmetry for the respective values of the laser driving power detected by the asymmetry detection circuit which is closest to the target value of asymmetry, and sets the value of the laser driving power associated with such value of asymmetry as being an optimum value. The driving power information indicating the value of such laser driving power is stored in the memory 47, while being transmitted to the APC circuit 31. This completes the OPC operation.

The CPU then proceeds to step S31 where it is judged, based upon the results of detection at the steps S13 and S16, whether or not data is recorded in both the subcode frame directly ahead of the recording start position and the subcode frame directly at back of the recording end position. If data is found to be recorded in both of the subcode frames, the CPU proceeds to step S32 where a variant of the laser driving power per subframe is found from the following equation:

variant =(laser driving power at the recording end position)–(laser driving power at the recording start position)/ (frame number at the recording end position)—(frame number at the recording start position)

The value of the variant thus found is stored as variant data in the memory 47. This allows the laser driving power to be changed stepwise on the subcode frame basis.

The CPU then proceeds to step S33 for setting the driving power information at the recording start position. That is, the CPU 24 causes the driving power information at the recording start position to be read out from the memory 47 where it is stored, and outputs a control signal to the APC circuit 31 depending on the driving power information. This sets the target laser driving power at the APC circuit 31. At the next step S34, data for one subcode frame is routed via the data encoder 28 to the laser driving circuit 29 with the target laser driving power as set at step S33 for recording the data for one subcode frame on the optical disc 7. At the next step S35, it is judged whether the recording end position has been reached. That is, it is detected at step S34 whether or not data has been recorded at the recording end position. If it is found that the recording end position has been reached, the processing of the present flow chart is terminated. If otherwise, the CPU proceeds to step S36 where the target laser driving power is changed by a value equal to the above variant. That is, the CPU 24 reads out the variant value data stored in the memory 47 in order to control the target laser driving power of the APC circuit 31 based upon the variant value data. The CPU then proceeds to step S34 in order to carry out the same operation as that explained previously.

If data is not recorded in both the subcode frame directly ahead of the recording start position and the subcode frame directly at back of the recording start position, that is if data is recorded in only one of the subcode frames or data is recorded in none of these subcode frames, the CPU proceeds to step S37 where it is judged, based upon the results of detection at steps S23 and S27, whether or not data is recorded in only the subcode frame directly ahead of the recording start position. If data is recorded in only the subcode frame directly ahead of the recording start position, the CPU proceeds to step S38 for recording the totality of data at the target laser driving power obtained from the target value of asymmetry at the recording start position. That is, the CPU 24 reads out the driving power information at the recording start position stored in the memory 47 for controlling the target driving power of the APC circuit 31 based upon the thus read-out driving power information. The CPU causes the totality of data to be recorded on the optical disc 7 with the target driving power. If it is found at step S37 that data is not recorded only in the subcode frame directly ahead of the recording start position, that is if data is recorded in only the subcode frame directly at back of the recording end position or if data is not recorded in the subcode frame directly ahead of the recording start position nor in the subcode frame directly at back of the recording end position, the CPU proceeds to step S39. At step S39, the totality of data is recorded with the target laser driving power obtained from the target value of asymmetry at the recording end position. That is, the CPU 24 causes the driving power information at the recording end position to be read out from the memory 47 where it is stored, and controls the target driving power of the APC circuit 31 based upon the target driving power information. The totality of data is recorded on the optical disc 7 with the target driving power. It is noted that, if data is not recorded in the subcode frame directly ahead of the recording start position nor in the subcode frame directly at back of the recording end position, recording is executed with the target driving power at the recording end position. The reason therefor is that, if data is recorded in none of the subcode frames, the same value of the driving power information is stored in the memory 47 for the recording start and recording end positions, so that it does not matter which of the values of the driving power information is employed.

In the above flow charts, the subcode frame directly at back of the recording end position is reproduced after reproduction of the subcode frame directly ahead of the recording start position and setting of the target value of asymmetry at the recording start position. This, however, is not limitative of the present invention. For example, the target value of symmetry at the recording start position and at the recording end position may also be set after reproducing the subcode frame directly before the recording start position and that directly after the recording end position.

The value of asymmetry may also be controlled by controlling the laser light radiation time duration, that is the laser light radiation start time and laser light radiation end time for formation of the same size of the pit, for example, the pit having a duration of 3T, in addition to being controlled by changing the laser driving power of the laser diode 1. In such case, a control signal is supplied from the CPU 24 to the laser modulation circuit 29 where the laser light radiation time is controlled.

It is also possible to employ a mid energy value β in place of the above-mentioned value of asymmetry. The mid energy value β may be found from the equation (2):

$$asy = \frac{1}{2} \quad \beta = \frac{A_1 + A_2}{2(A_1 - A_2)} \quad (2)$$

It will be seen from the foregoing that the optical disc recording apparatus of the present invention enables the data error rate to be reduced since the value of asymmetry may be detected from data previously recorded on the optical disc when additionally recording data thereon, and the value of asymmetry of the additionally recorded data may be equated to the value of asymmetry of previously recorded data.

What is claimed is:

1. An apparatus for recording data signals onto an optical recording medium comprising means for radiating a laser beam onto said optical recording medium, photo-electric converting means for converting the laser beam reflected from the optical recording medium into an electrical signal, first detection means for detecting whether or not the data signals are recorded on said optical recording medium based upon an output of said photo-electric converting means, second detection means for detecting a value of asymmetry based upon the output of said photo-electric converting means, and control means for controlling said first detection means, prior to recording of said data signals on said optical recording medium, to detect whether or not the data signals are recorded in a region proximate to a region of the optical recording medium in which the data signals are to be recorded, said control means setting a value of asymmetry detected by said second detection means based on the data signal reproduced from said proximate region as being a target value of asymmetry when said data signals are recorded in said proximate region, said control means setting a predetermined value of asymmetry as said target value of asymmetry when data signals are not recorded in said proximate region.

2. The apparatus as claimed in claim 1, wherein said control means sets a driving power for said laser radiating means based upon said target value of asymmetry.

3. The apparatus as claimed in claim 2, wherein said control means causes said first detection means to detect whether or not said data signals are recorded in a region directly ahead of a region of the optical recording medium where said data signals are to be recorded.

4. The apparatus as claimed in claim 2, wherein said control means causes said first detection means to detect whether or not said data signals are recorded in a region directly at back of a region of the optical recording medium where said data signals are to be recorded.

5. The apparatus as claimed in claim 2, wherein said control means causes said first detection means to detect whether or not said data signals are recorded in both the region directly at back of a region of the optical recording medium where said data signals are to be recorded and the region directly ahead of a region of the optical recording medium where said data signals are to be recorded.

6. The apparatus as claimed in claim 5, wherein when said data signals have been detected to be recorded in both the regions directly at back and directly ahead of a region of the optical recording medium where said data signals are to be recorded, said control means causes said second detection means to detect a first value of asymmetry from the data signals reproduced from the region of the optical recording medium directly ahead of the region thereof where said data signals are to be recorded, said control means also causing said second detection means to detect a second value of asymmetry from the data signals reproduced from the region of the optical recording medium directly at back of the region thereof where said data signals are to be recorded, said control means driving said laser radiating means during recording said data signals by a driving power as set based upon the first value of asymmetry at a leading end of the region where said data signals are to be recorded and by a driving power as set based upon the second value of asymmetry at a trailing end of the region where said data signals are to be recorded.

7. The apparatus as claimed in claim 2, wherein said control means cause said laser radiating means to record pre-set data signals in a tentative write region of said optical recording medium while the driving power is sequentially changed, said control means causing said asymmetry detecting means to detect a value of asymmetry at each value of the driving power based upon data signals reproduced from the tentative write region by said photo-electric converting means, said control means causing said laser radiating means to be driven at a driving power corresponding to the value of asymmetry closest to said target value of asymmetry.

8. The apparatus as claimed in claim 1, wherein said control means sets the driving time for said laser radiating means based upon said target value of asymmetry.

\* \* \* \* \*